United States Patent
Myrttinen et al.

(10) Patent No.: US 6,630,013 B2
(45) Date of Patent: Oct. 7, 2003

(54) ASSEMBLY FOR AN AIR SEPARATOR AND METHOD FOR CONTROLLING THE FUNCTION OF THE SAME

(75) Inventors: Martti Myrttinen, München (DE); Ilkka Roitto, Masku (FI)

(73) Assignee: Metso PaperChem Oy, Raisio (FI)

(*) Notice: Subject to any disclaimer, the term of this patent is extended or adjusted under 35 U.S.C. 154(b) by 67 days.

(21) Appl. No.: 09/902,380

(22) Filed: Jul. 10, 2001

(65) Prior Publication Data

US 2002/0011151 A1 Jan. 31, 2002

(30) Foreign Application Priority Data

Sep. 13, 2000 (FI) .............................. 20002022
Jul. 11, 2000 (FI) .............................. 20001651

(51) Int. Cl.⁷ ............................................. B01D 19/00
(52) U.S. Cl. .............................. 95/243; 95/261; 96/156; 96/209; 96/212; 96/215
(58) Field of Search ................. 95/261, 241, 243; 96/156, 155–212, 215, 216; 210/188

(56) References Cited

U.S. PATENT DOCUMENTS

| 4,170,457 A | 10/1979 | Tetro | 55/46 |
| 4,390,351 A | 6/1983 | Matsui et al. | 55/204 |
| 5,827,357 A | * 10/1998 | Farion | |
| 2002/0011151 A1 | * 1/2002 | Myrttinen et al. | |

FOREIGN PATENT DOCUMENTS

FI          198792          4/1995

* cited by examiner

*Primary Examiner*—Duane S. Smith
(74) *Attorney, Agent, or Firm*—Cohen, Pontani, Lieberman & Pavane

(57) ABSTRACT

An apparatus and method for deaeration of treatment agents applied to webs of paper and board, having an inlet manifold (3), an accept-fraction manifold (4), and a reject-fraction manifold (5). For deaeration the assembly uses a plurality of air separator units (12) connected to the manifolds so as to allow admission of the treatment agent to the air separator units (12) from the inlet manifold (3) and discharge of the accept and reject fractions formed in the air separator units (12) respectively to the accept-fraction and reject-fraction manifolds (4, 5). A cut-off valve (18) is mounted on at least the inlet manifold (3), between two parallel-operating air separator units (12), so as to permit cutting off the flow through the manifold (3) at this location of the cut-off valve, dividing the plural air separator units (12) by the cut-off valve (18) into two groups.

Figure 1:
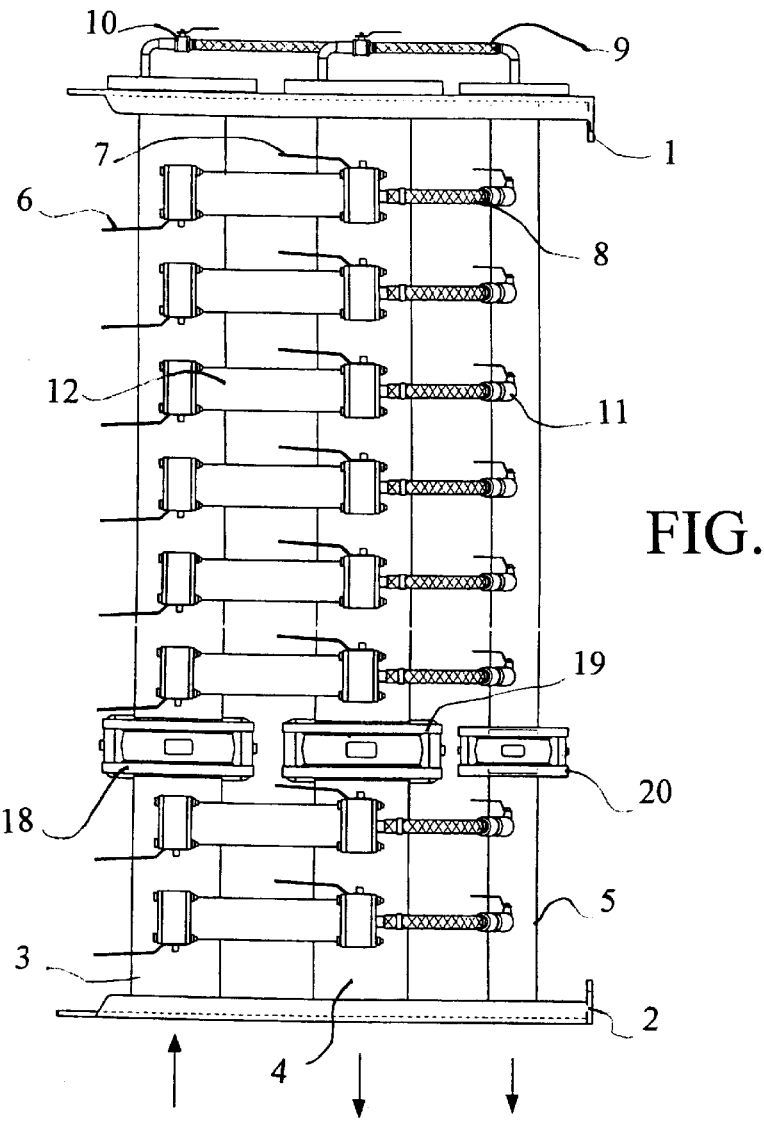

5 Claims, 2 Drawing Sheets

ASSEMBLY FOR AN AIR SEPARATOR AND METHOD FOR CONTROLLING THE FUNCTION OF THE SAME

FIELD OF THE INVENTION

The present invention relates to an assembly for use in an apparatus serving for deaeration of treatment agents applied to webs of paper and board, whereby the assembly makes it possible to adjust the capacity of the air separator for different volumetric flow rates.

The invention also relates to a method for controlling the operation of an air separator.

BACKGROUND OF THE INVENTION

In coating a web of paper or board, a treatment agent such as water-based size or pigment mixture is applied to the surface of the web to be treated. Conventionally, the treatment agent is applied in an excess amount and the surface of the treated web is smoothed by means of a doctor. The excess amount is returned after straining back to the main circulation of the treatment agent stock. Additionally, applicators of a treatment agent frequently use a flushing circulation or the like, wherefrom also a certain amount of the treatment agent is returned after straining back to the main circulation. Particularly during application and doctoring, air may have access into the treatment agent stock, whereupon the entrained air and bubbles may cause profile defects and even uncoated spots on the layer of applied treatment agent. Entrained air causes the greatest problems in coating with a pigment-containing coating mix and particularly problematic are such processes that involve high shear rates of the coating mix. The problem appears more accentuated with certain types of coating formulations that are prone to entrain large volume of air. Such formulations are talc-containing coating mixes, for instance. Accordingly, it is imperative to separate air as efficiently as possible from the web treatment agent before its pumping to the applicator apparatus.

In U.S. Pat. No. 4,170,457 is disclosed one kind of air separator comprising a cylindrical tank rotatable about a vertical axis. The coating liquid stock is pumped into the tank via its top and, under the effect of the centrifugal action, the coating liquid is driven onto the tank walls, whereby the air-laden portion of the coating stock remains in the radially central region of the tank and may thus be removed therefrom via the top of the tank. This apparatus is relatively complicated and needs a drive motor. As the apparatus contains moving parts, it needs scheduled maintenance and replacement of worn components. U.S. Pat. No. 4,390,351 describes an apparatus comprised of a spiraling tube or the like passage through which the liquid is forced to pass. The channel has specific compartments and spaces formed thereto, wherein the entrained air bubbles can be separated from the liquid circulating in the spiraling passage. While this apparatus features a simple construction, its efficiency is rather poor.

In FI Pat. No. 98,792 is disclosed a relatively efficient air separator apparatus. In this embodiment, the liquid or other mixture flowing therethrough is admitted tangentially into the upper region of a cylindrical separator tube, wherein the liquid is forced into a rapid vorticous motion. Herein, the air-laden fraction of the liquid is forced into the radially central region of the cylindrical separator tube and can be removed centrally from the tube at the lower end thereof. The air-free fraction is similarly removed from the lower end of the tube, at the radially marginal region of the tube. To attain a good air separation efficiency in this kind of apparatus, a relatively high velocity is required from the inlet flow. For this purpose, the diametral dimensions of the cylindrical separator tube and its inlet/outlet nozzles need to be made sufficiently small to ensure such a rapid flow velocity at the available flow rate. Another vital reason for the use of a small-diameter cylindrical separator tube is that hereby a short transit distance of entrained air bubbles from the peripheral region of the tube to the center of the tube becomes short, whereby a faster and thus more efficient separation is attained. Hence, this kind of air separator is generally operated in parallel groups so that the combined capacity of all the air separators in the group is sufficient for handling the required volumetric flow rate. The air separators are grouped so that, e.g., their inlet nozzles are connected to an inlet manifold and the reject/accept fraction outlet nozzles are respectively connected to a reject discharge manifold and an accept outlet manifold. In this fashion, the air separator assembly can be readily dimensioned for a desired capacity while simultaneously assuring a sufficiently high flow velocity in the separator units that is needed for efficient air separation. An air separator assembly formed according to these design rules may comprise, e.g., 5 to 30 separator units connected to common manifolds.

The individual separator units can be isolated from the manifolds by manual cut-off valves or plugs. During a normal production run, the output flow rate of the pump that circulates the treatment agent in the machine circulation of an applicator apparatus is substantially constant within a minor deviation range depending on the running speed of the applicator section of the coating mix or size. By setting the capacity of the air separator assembly through shutting off a suitable number of the separator units by plugging or operation of the manual cut-off valves so as to comply with the actual output of the machine circulation pump during the run, it is generally possible to match the capacity of the air separator assembly fairly well with the requirements of the applicator apparatus over its normal range of web speeds. Hence, there is no need during a normal production run for adjusting the air separator capacity.

During production shut-down periods and otherwise when no coat or size application is performed, the pump output is decreased to a low level of about 20% known as the stand-by circulation rate. It is disadvantageous to cut off the circulation entirely, because restarting the machine circulation of the treatment agent subsequently interferes with the run-up of the entire production line, and additionally incurs the risk of plugged circulation by dried clumps of the treatment agent. With the decreased overall circulation rate, also the flow rate through each separator unit falls even down to a level so low as to compromise efficient air separation in any one of the separator units. Resultingly, the stand-by flow rate produced by the circulation pump allows admission of air into the machine circulation of the treatment agent. During the restart of application and the run-up of the circulation pump output to that required for application, it takes several minutes to reduce the entrained air content of the treatment agent down to the low level corresponding to the normal application run state. During this transient period of time, the paper qualities such as its coat evenness, for instance, fall short of preset specifications thus requiring dumping of the produced web into the broke pulper. In fast-running applicators this causes a substantial production loss and, obviously, a longer production shutdown.

The above-described problem can be avoided by way of replacing the manual valves of the inlet, accept and reject fraction manifolds by automatic valves, whereby a desired number of separator units can be shut off from the circulation in the stand-by state. As such a shut-off operation must be carried out rapidly, manual valves are clumsy to manipulate when the separator assembly is to be adjusted to the stand-by state and, vice versa, it is practically impossible to open a large number of manual valves at the run-up of the circulation pump for the higher output. Herein, it must be appreciated that as each separator unit is equipped with three manual valves and the assembly may comprise up to 30 separator units, at the instant of circulation pump output increase for full-speed operation an enormous task emerges to open all the valves momentarily. As to the use of automatically controlled valves, this is a disadvantageous alternative inasmuch a large number of automatically controlled valves incurs a higher cost and the fitting of automatic valves with actuators into the limited space between the nozzles and the manifolds requires a greater space between the separator units and outdistancing of the same from the framework of the air separator assembly, whereby inevitably also the external dimensions of the air separator assembly become larger. This is awkward and, hence, retrofitting an air separator to the treatment agent machine circulation of older applicator sections in particular is frequently complicated by the insufficient footprint of available installation space. Accordingly, it is desirable to achieve a method and assembly that could permit the adaptation of an air separator in a simple manner to the requirements of a reduced volumetric flow rate of circulating treatment agent.

SUMMARY OF THE INVENTION

It is an object of the present invention to provide an assembly offering flow-rate-based capacity adjustment in equipment serving for air separation from treatment agent mixtures used in application to a web of paper or board.

The goal of the invention is achieved by virtue of equipping at least the inlet manifold or accept manifold of an air separator with a valve, advantageously an automatically controlled valve, that cuts off flow in the manifold so as to permit passage of the treatment agent flow from the manifold only to certain ones of the air separator units of the assembly.

According to a preferred embodiment of the invention, the automatically controlled valves are fitted not only to the inlet manifold, but also at respective points of the accept and reject manifolds.

The invention offers significant benefits.

The invention makes it readily possible to adapt an air separator for two different separation capacities. The modifications required on an existing air separator are minimal and the overall cost of the air separator is increased only slightly. The modification is mechanically and structurally simple to carry out and, moreover, the external dimensions of the air separator can be retained almost unchanged as compared to those of an unmodified separator. Resultingly, the air separator improved according to the invention can be fitted in a small space, which is an advantage in revamping the treatment agent machine circulation of older applicator sections.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the following, the invention will be examined in more detail by making reference to the appended drawings in which like numerals delineate similar elements throughout the several views:

FIG. 1 is a side view of an embodiment according to the invention;

FIG. 2 is an end view of the apparatus of FIG. 1; and

FIG. 3 is a schematic view of an air separator that can be used with the apparatus of FIG. 1.

DETAILED DESCRIPTION OF THE PRESENTLY PREFERRED EMBODIMENTS

The present invention is directed to an air separator that advantageously is based on air separator units 12 according to Finnish Patent No. 98,792. FIG. 3 shows in more detail the air separator unit of Finnish Patent No. 98,792 in an air separator assembly. The air separator is generally denoted by reference numeral 110. The function of the air separator unit 110 in the separation of air from a liquid substance, particularly such as is used in application to a paper or the like web material, is based on the effect of centrifugal force. The air separator unit 110 comprises a vertically-aligned, cylindrical separator tube 111 having its upper end equipped with an inlet nozzle 112 via which the liquid substance, also called the coating furnish, is passed into the interior of the separator tube 111, wherefrom the treated coating furnish is passed out via an outlet nozzle 113 adapted to the lower end of the separator tube 111. The inlet nozzle 112 is adapted to enter the separator tube 111 of the air separator unit 110 tangentially thus forcing the coating furnish in the interior of the separator tube 111 into vorticous motion directed along the inner wall of the separator tube 111. Respectively, the outlet nozzle 113 is adapted to exit tangentially from the separator tube 111, thus aiding the discharge of the coating furnish from the separator tube 111.

The inlet end of the air separator unit 110 having the inlet duct 112 equipped with a spiraling guide 122 that directs the coating furnish inlet flow downward in the direction of the longitudinal axis of separator tube 111. An equivalent spiraling guide 123 is also positioned at the outlet nozzle in order to augment the exit flow of the coating furnish. The spiraling guides 122, 123 are not, however, essential to the function of the air separator unit inasmuch as even the vertical pressure differential alone is sufficient to drive the coating furnish downward in the direction of the longitudinal axis of separator tube 111. The vorticous motion of the coating furnish set up in the interior of the separator tube 111 generates into the coating furnish flow a pressure gradient that causes the entrained air as a substance lighter than the coating furnish to separate toward the center region of the vortex. Thence, into the center region of separator tube 111 is formed an air froth core denoted by reference letter A.

At the lower end of separator tube 111, functioning in conjunction with the outlet duct 113, is an air discharge tube 119 extending into the air froth core A. Concentrically with the separator tube 111, to the air discharge tube 119 is formed an air discharge duct 121 communicating with an air discharge nozzle 117. The function of this air discharge duct 121 is to allow the separated air or, more precisely, the air-rich froth of coating furnish accumulated into the center region of separator tube 111 to exit via the air discharge nozzle 117. The air-lean coating furnish is removed from the air separator unit 110 tangentially via the coating furnish outlet duct 113. Obviously, air discharge from the air separator unit 110 could be accomplished simply by forming a central opening in the bottom of the separator unit. However, such an opening would permit a vastly greater amount of coating furnish to escape as compared with the construction according to the invention. The benefit is particularly attained by arranging the air discharge tube 119 to extend appropriately into the air froth core A. Depending on the characteristics of the coating furnish used, the length of the air discharge tube 119 can be dimensioned so as to maximize the removal efficiency of entrained air. The air discharge tube 119 is formed into an integral part of the lower end flange 115 of the air separator unit 110 which is attached with suitable mounting hardware such screws 125 to the air separator unit 110.

Figure 3:
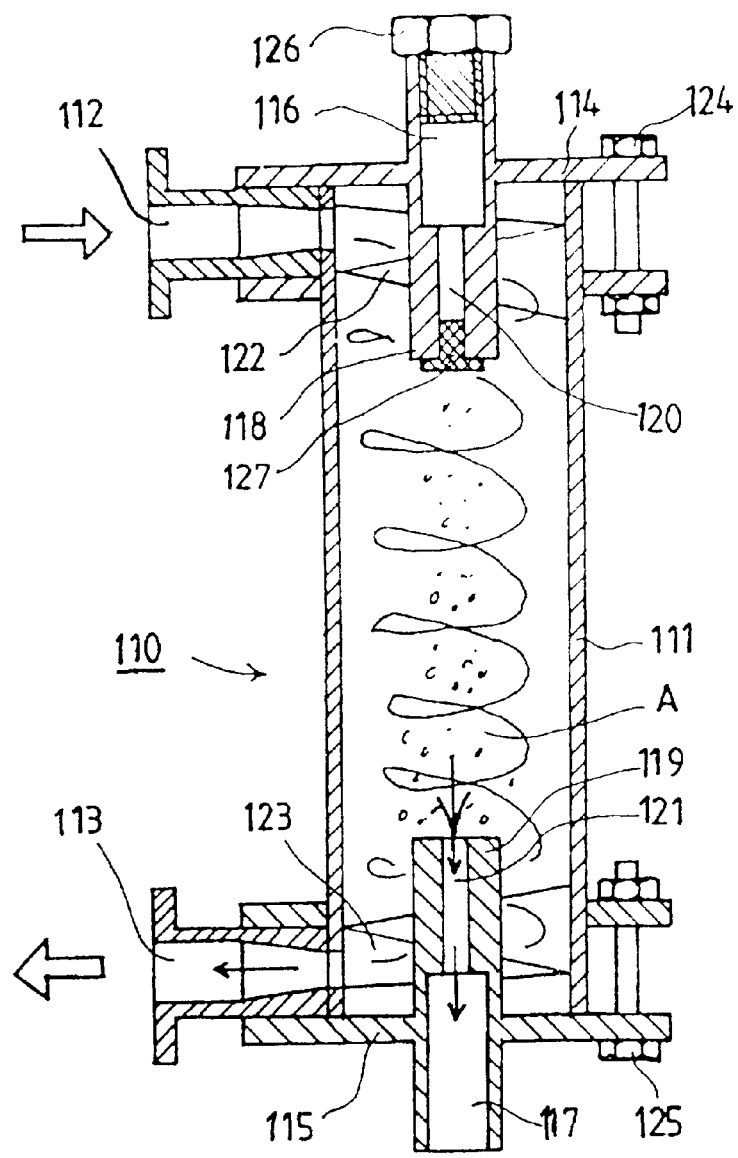

Further, the top end of the air separator unit is made similar to the construction of the bottom end in the unit. Hence, also the top end flange 114 of the air separator unit 110 is provided with an air discharge tube 118 having an air discharge duct 120 extending through its center. The air discharge duct 120 communicates with an air discharge opening 116. In this case, however, the air discharge opening 116 is closed with a cover 126 and a plug 127, because air discharge is arranged to take place via the bottom of the air separator unit. In the same fashion as the bottom end flange, the top end flange 114 is attached with mounting screws 124 to the air separator unit 110. Inasmuch as air discharge in this embodiment does not take place via the top of the unit, the top end flange 114, however, may have a vastly simplified construction such that the top end comprises only a blind flange having no air discharge openings or the like made thereto. In practice, the air separator unit 110 having identical end flanges discussed above is more advantageous inasmuch as when the air discharge opening 121 erodes, the unit can be simply remounted upside down and the inlet/discharge flows can be reversed into directions opposite to those shown in FIG. 3. In principle, the air discharge opening 121 is the only item of the unit subject to wear.

In an air separator assembly, air separator units 12 are connected to the framework of the assembly by a number of units sufficient to provide the required separation capacity. The framework of the air separator assembly comprises an inlet manifold 3, an accept fraction manifold 4 and a reject fraction manifold 5. The manifolds 3, 4, 5 are terminated at end flanges 1 and 2. The inlet-side flange 2 has openings made thereto for the flow passing in the manifolds 3, 4, 5, while the outlet-side end flange 1 has blind flanges 15, 16, 17 mounted thereon for closing the ends of the manifolds. The reject-fraction discharge manifold 5 is connected via blind flange 17 by means of flexible hoses 9, 10 equipped with manual valves to blind flange 16 of the accept-fraction manifold 4 and blind flange 15 of the inlet manifold 3. Hoses 9, 10 make it possible to interconnect the manifolds for flushing or washing the ends of the manifolds.

Figure 2:
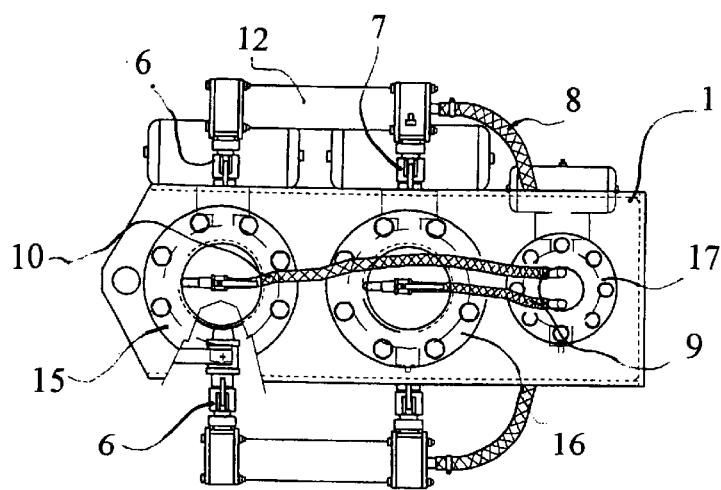

As shown in FIGS. 1 and 2, the air separator assembly comprises 16 pcs. air separator units 12 mounted on both sides of the manifolds 3, 4, 5. The inlet nozzles of the air separator units 12 are connected to the inlet manifold via manual valves 6 and the accept-fraction outlet nozzles are connected to the accept-fraction manifold 4 via manual valves 7. Respectively, reject discharge nozzles are connected to the reject-fraction manifold 5 via a hose 8 equipped with a manual valve 11. Thus, the manual valves 6, 7, 11 make it possible to disconnect as many individual air separator units off from the circulation as are required to match the capacity of the air separator assembly to the run-time volumetric flow rate of the machine circulation of the applicator apparatus.

When the air separator described above is in its run-time production use, the treatment agent is admitted in the air separator first into the inlet manifold 3, wherefrom its passes via the air separator units 12 so as to separate therein into accept and reject fractions that are further passed to their respective manifolds and therefrom out of the air separator assembly. For reduced capacity during stand-by circulation periods, the air separator assembly has cut-off valves 18, 19 and 20 mounted on the manifolds 3, 4, 5. These cut-off valves in the illustrated embodiment are located after the two first air separator units 12 as counted from the inlet-side main flange 2, whereby a total number of four air separator units 12 remain between the cut-off valves 18, 19, 20 and the inlet-side main flange 2. Respectively, a total number of 12 air separator units remain on the opposite side from the cut-off valves. This division ratio gives a reduced capacity that generally matches with the 20% stand-by output of the machine circulation pump as compared to its run-time output during full production obviously, the position of the cut-off valves on the manifold is selected so that the thus achieved reduction of separator capacity matches with the capacity need ratio between the run-time and stand-by states of the treatment agent machine circulation.

The embodiment according to the invention is simply operated so that when the machine circulation pump is controlled to its stand-by output, the cut-off valves are automatically closed by a suitable control command that may be linked to, e.g., the pump output control, the control computer of the air separator assembly or a command issued from the operator console. Respectively, the cut-off valves are opened when the run-time separator capacity of full production is assumed. An essential requirement herein is that the closing/opening of the valves must take place sufficiently accurately synchronized with the control of the machine circulation flow rate so that the flow in the air separator units will not slow down nor there will occur any detrimental pressure shocks or elevations. The valves can be of any suitable type and their control may be implemented using conventional actuators capable of operating the valves, e.g., by electrical, hydraulic or pneumatic means.

In addition to those described above, the invention may have alternative embodiments.

In principle, a cut-off valve is needed only on the inlet manifold or the accept-fraction manifold, because either one is capable of blocking the circulation of the treatment agent in separator units that are located downstream from the cut-off valves. However, if the reject-fraction and accept-fraction manifold are not respectively cut off, there may occur some degree of disturbing sideflows and backflows in the assembly as well as a partial emptying of the manifolds, whereby the drying of treatment agent becomes an imminent risk. In contrast, a full cut-off of all manifolds assures unchanged moisture content in the closed section of the air separator assembly and at least the rate of drying is slowed down. For these reasons, it is a good practice to mount cut-off valves at least on the inlet and accept-fraction manifolds, even more advantageously on all manifolds in accordance with the above-described embodiment.

The invention may generally be applied to all such air separator installations that use a plurality of air separator units. However, the above-described type of air separator has proven its merits by its simplicity and efficiency. The number of the air separator units and the position of the cut-off valves may be varied and, when necessary, cut-off valves can be fitted only on one side of the manifolds. In principle, the assembly could be implemented using a plurality of parallel manifolds, but in the interest of a more efficient utilization of the overall footprint, it may be preferable to install a plurality of parallel-operating air separator assemblies if necessary to attain a specified capacity. In the context of this application, the term manifold must be understood broadly to refer to any chamber-like space, not only to a straight tubular manifold. However, the division of flows in other shapes of manifold chambers by means of valves is clumsier and may possibly require the use of large gate valves, for instance.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An assembly in an apparatus used for deaeration of a treatment agent applied to a web of paper or board, the assembly comprising:
   at least one inlet manifold;
   at least one accept-fraction manifold;
   at least one reject-fraction manifold;
   a framework to which said manifolds are fixed;
   at least two air separator units connected to said manifolds so as to allow admission of the treatment agent to said air separator units from said inlet manifold and discharge of accept and reject fractions formed in said air separator units respectively to said accept-fraction manifold and said reject-fraction manifold; and at least one cut-off valve mounted on at least one of said accept-fraction manifold and said inlet manifold, between two parallel-operating air separator units, so as to permit cutting off of a flow through the manifold at a location of said cut-off valve to divide said air separator units by said cut-off valve into two groups.

2. The assembly of claim 1, wherein one of said cut-off valves is mounted on each of said inlet manifold, said reject-fraction manifold, and said accept-fraction manifold, and wherein said cut-off valves are mounted in a similar position on each respective manifold.

3. The assembly of claim 1, wherein said air separator units are each shaped as an elongated cylindrical vessel having at a first end a means for admitting the treatment agent tangentially into said cylindrical vessel, and at a second end a means for discharging the reject-fraction from a radially central region of the cylindrical vessel and a means for removing the accept-fraction from the a radially marginal region of the cylindrical vessel.

4. A method for deaeration of a treatment agent applied to a web of paper or board, the method comprising:
   admitting a flow of the treatment agent via an inlet manifold into at least two air separator units;
   separating the flow of the treatment agent in the separator units into an accept fraction and a reject fraction;
   discharging the accept and reject fractions from the air separator units to flow into an accept-fraction manifold and a reject-fraction manifold, respectively; and
   cutting off the flow in at least one of the accept-fraction manifold and the inlet manifold between two parallel-operating air separator units when a reduced air separation capacity is required.

5. The method of claim 4, wherein the air separator units are each shaped as an elongated cylindrical vessel, and the treatment agent fractions are separated in the air separator units by means of bringing the treatment agent into a vorticous motion in the interior of the cylindrical vessel.

* * * * *